United States Patent
Nakamura et al.

(10) Patent No.: US 9,854,121 B2
(45) Date of Patent: Dec. 26, 2017

(54) IMAGE PROCESSING APPARATUS FOR GENERATING A DIGITIZED DOCUMENT BY USING IMAGE DATA AND METHOD FOR CONTROLLING THE SAME

(71) Applicant: CANON KABUSHIKI KAISHA, Tokyo (JP)

(72) Inventors: Yasuyuki Nakamura, Yokohama (JP); Yoshitake Mizuno, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/678,776

(22) Filed: Apr. 3, 2015

(65) Prior Publication Data

US 2015/0304520 A1    Oct. 22, 2015

(30) Foreign Application Priority Data

Apr. 18, 2014  (JP) ................................ 2014-086611
Dec. 4, 2014  (JP) ................................ 2014-246330

(51) Int. Cl.
*H04N 1/21*      (2006.01)
*H04N 1/00*      (2006.01)

(52) U.S. Cl.
CPC ....... *H04N 1/2179* (2013.01); *H04N 1/00411* (2013.01); *H04N 1/00482* (2013.01)

(58) Field of Classification Search
CPC ......... G06F 17/30613; G06F 17/30616; G06F 17/30625; G06F 17/2745; G06F 17/30253; H04N 1/2179

USPC ............ 358/1.11, 1.16, 1.17, 505, 538, 403; 707/661, 665, 667

See application file for complete search history.

(56) References Cited

U.S. PATENT DOCUMENTS

| | | | | |
|---|---|---|---|---|
| 6,327,387 B1* | 12/2001 | Naoi | ................. | G06K 9/2054 |
| | | | | 382/173 |
| 6,831,758 B1* | 12/2004 | Toda | ................ | H04N 1/00209 |
| | | | | 358/440 |
| 2004/0148453 A1* | 7/2004 | Watanabe | ................ | H04N 1/21 |
| | | | | 711/1 |

(Continued)

FOREIGN PATENT DOCUMENTS

| | | |
|---|---|---|
| JP | 2000-341502 A | 12/2000 |
| JP | 2005-56315 A | 3/2005 |

(Continued)

*Primary Examiner* — Jamares Q Washington
(74) *Attorney, Agent, or Firm* — Canon USA Inc., IP Division

(57) ABSTRACT

An image processing apparatus according to the present invention includes a specification unit configured to acquire first image data and second image data, and specify a character string out of character strings included in the first image data, and a storage unit configured to store the first and the second image data in one folder in a case where a character string in the second image data at a position corresponding to a position of the specified character string in the first image data coincides with the character string specified by the specification unit, and configured to store the first and the second image data in different folders in a case where the character string in the second image data at the position corresponding to the position of the character string in the first image data specified by the specification unit does not coincide with the specified character string.

16 Claims, 22 Drawing Sheets

(56) References Cited

U.S. PATENT DOCUMENTS

| | | | | |
|---|---|---|---|---|
| 2004/0208371 A1* | 10/2004 | Liu | ............... | G06K 9/00442 |
| | | | | 382/173 |
| 2008/0050019 A1* | 2/2008 | Morohoshi | ............. | G06K 9/03 |
| | | | | 382/187 |
| 2008/0117472 A1* | 5/2008 | Nohtomi | ............ | H04N 1/00244 |
| | | | | 358/403 |
| 2014/0093170 A1* | 4/2014 | Ohguro | ............. | G06K 9/00469 |
| | | | | 382/176 |

FOREIGN PATENT DOCUMENTS

| JP | 2008-131189 A | 6/2008 |
|---|---|---|
| KR | 10-2005-0005413 A | 1/2005 |

* cited by examiner

FIG.4A

- INVOICE ~1
- 2~ DATE OF ISSUE: JANUARY 20, 2014
- BILL TO: ~4
- AAA INC. ~3 / 5
- 6~ ZZZ INC.
  ADDRESS: 1-2-3 OO-CHO OO-CITY OOO-PREF. JAPAN
  PHONE: OOO-123-4567
- WE DEEPLY THANK YOU FOR YOUR CONTINUED SUPPORT.
  THE TOTAL AMOUNT PAYABLE IS AS FOLLOWS.
- TOTAL AMOUNT ~7
- ¥1,200,000 ~8
- PAYMENT DEADLINE: FEBRUARY 20, 2014 ~9
- 10~ APPROVED | PREPARED ~11
- SATO | TANAKA
- 12    13

FIG.4B

| |
|---|
| INVOICE |
| DATE OF ISSUE: JANUARY 20, 2014 |
| AAA INC. |
| BILL TO: |
| WE DEEPLY THANK YOU FOR YOUR CONTINUED SUPPORT. |
| THE TOTAL AMOUNT PAYABLE IS AS FOLLOWS. |
| ZZZ INC. |
| ADDRESS: 1-2-3 OO-CHO OO-CITY OOO-PREF. JAPAN |
| PHONE: OOO-123-4567 |
| TOTAL AMOUNT |
| ¥1,200,000 |
| PAYMENT DEADLINE: FEBRUARY 20, 2014 |
| APPROVED |
| PREPARED |
| SATO |
| TANAKA |
| |
| |

FIG.5A

INVOICE

DATE OF ISSUE: JANUARY 20, 2014

BILL TO: AAA INC.

ZZZ INC.
ADDRESS: 1-2-3 OO-CHO OO-CITY OOO-PREF. JAPAN
PHONE: 000-123-4567

WE DEEPLY THANK YOU FOR YOUR CONTINUED SUPPORT.
THE TOTAL AMOUNT PAYABLE IS AS FOLLOWS.

TOTAL AMOUNT ¥1,200,000

| APPROVED | PREPARED |
|---|---|
| SATO | TANAKA |

PAYMENT DEADLINE: FEBRUARY 20, 2014

FIG.5B

INVOICE

DATE OF ISSUE: JANUARY 20, 2014

BILL TO: BBB INC.

ZZZ INC.
ADDRESS: 1-2-3 OO-CHO OO-CITY OOO-PREF. JAPAN
PHONE: 000-123-4567

WE DEEPLY THANK YOU FOR YOUR CONTINUED SUPPORT.
THE TOTAL AMOUNT PAYABLE IS AS FOLLOWS.

TOTAL AMOUNT ¥100,000

| APPROVED | PREPARED |
|---|---|
| SATO | SUZUKI |

PAYMENT DEADLINE: FEBRUARY 20, 2014

FIG.5C

INVOICE

DATE OF ISSUE: JANUARY 20, 2014

BILL TO: CCC BUILDER

ZZZ INC.
ADDRESS: 1-2-3 OO-CHO OO-CITY OOO-PREF. JAPAN
PHONE: 000-123-4567

WE DEEPLY THANK YOU FOR YOUR CONTINUED SUPPORT.
THE TOTAL AMOUNT PAYABLE IS AS FOLLOWS.

TOTAL AMOUNT ¥50,000

| APPROVED | PREPARED |
|---|---|
| SATO | KIMURA |

PAYMENT DEADLINE: FEBRUARY 20, 2014

FIG.5D

| INVOICE | 501 |
|---|---|
| DATE OF ISSUE: JANUARY 20, 2014 | |
| AAA INC. | 502 |
| BILL TO: | |
| WE DEEPLY THANK YOU FOR YOUR CONTINUED SUPPORT. | |
| THE TOTAL AMOUNT PAYABLE IS AS FOLLOWS. | |
| ZZZ INC. | 503 |
| ADDRESS: 1-2-3 OO-CHO OO-CITY OOO-PREF. JAPAN | |
| PHONE: OOO-123-4567 | |
| TOTAL AMOUNT | |
| ¥1,200,000 | 504 |
| PAYMENT DEADLINE: FEBRUARY 20, 2014 | |
| APPROVED | 505 |
| PREPARED | |
| SATO | |
| TANAKA | 506 |

FIG.5E

| INVOICE | 501 |
|---|---|
| DATE OF ISSUE: JANUARY 20, 2014 | |
| BBB INC. | 502 |
| BILL TO: | |
| WE DEEPLY THANK YOU FOR YOUR CONTINUED SUPPORT. | |
| THE TOTAL AMOUNT PAYABLE IS AS FOLLOWS. | |
| ZZZ INC. | 503 |
| ADDRESS: 1-2-3 OO-CHO OO-CITY OOO-PREF. JAPAN | |
| PHONE: OOO-123-4567 | |
| TOTAL AMOUNT | |
| ¥100,000 | 504 |
| PAYMENT DEADLINE: FEBRUARY 20, 2014 | |
| APPROVED | 505 |
| PREPARED | |
| SATO | |
| SUZUKI | 506 |

FIG.5F

| INVOICE | 501 |
|---|---|
| DATE OF ISSUE: JANUARY 20, 2014 | |
| CCC BUILDER | 502 |
| BILL TO: | |
| WE DEEPLY THANK YOU FOR YOUR CONTINUED SUPPORT. | |
| THE TOTAL AMOUNT PAYABLE IS AS FOLLOWS. | |
| ZZZ INC. | 503 |
| ADDRESS: 1-2-3 OO-CHO OO-CITY OOO-PREF. JAPAN | |
| PHONE: OOO-123-4567 | |
| TOTAL AMOUNT | |
| ¥50,000 | 504 |
| PAYMENT DEADLINE: FEBRUARY 20, 2014 | |
| APPROVED | 505 |
| PREPARED | |
| SATO | |
| KIMURA | 506 |

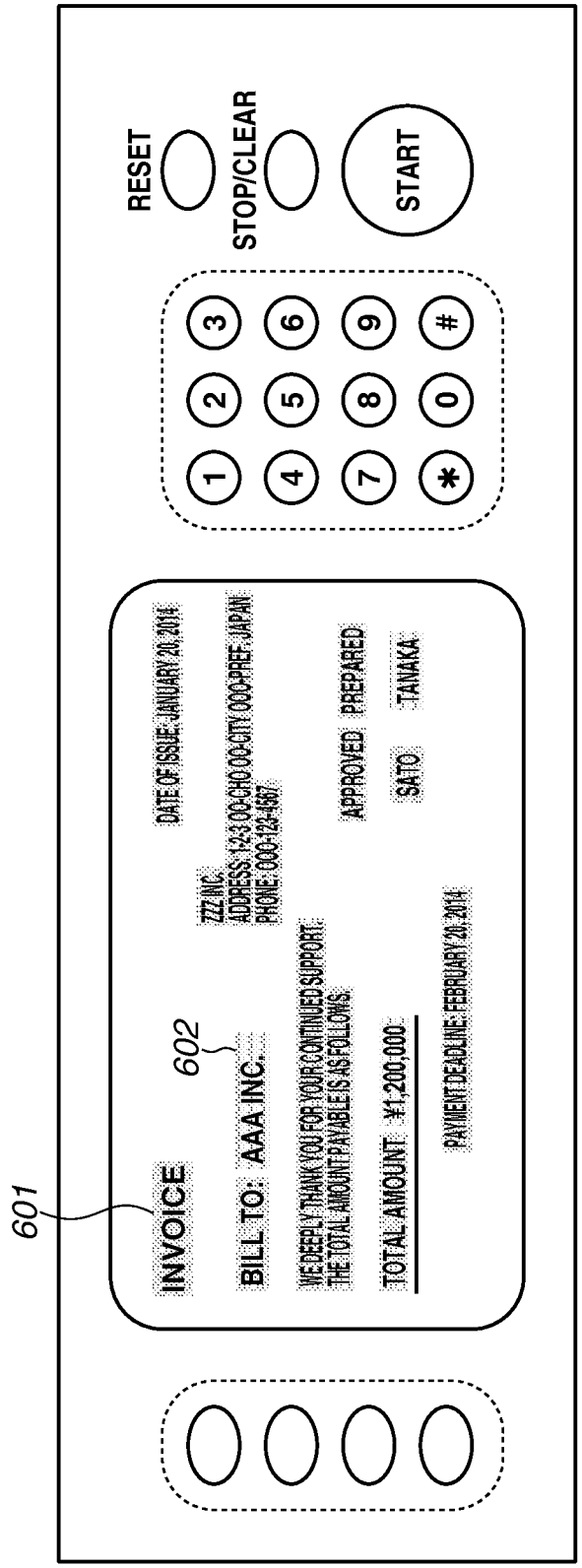

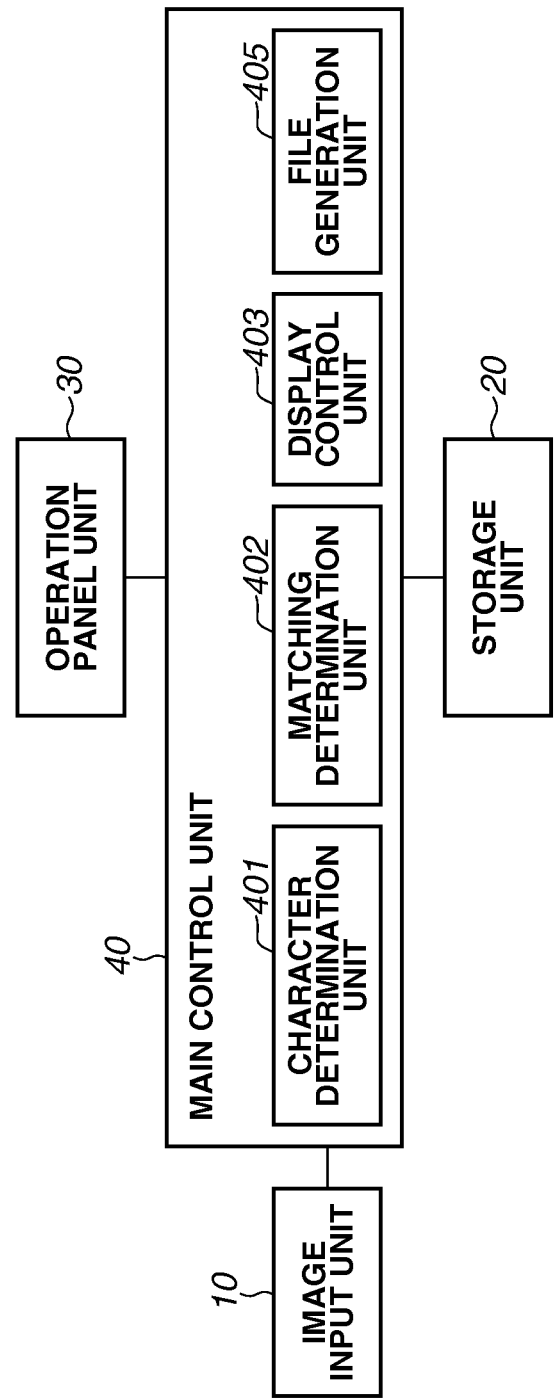

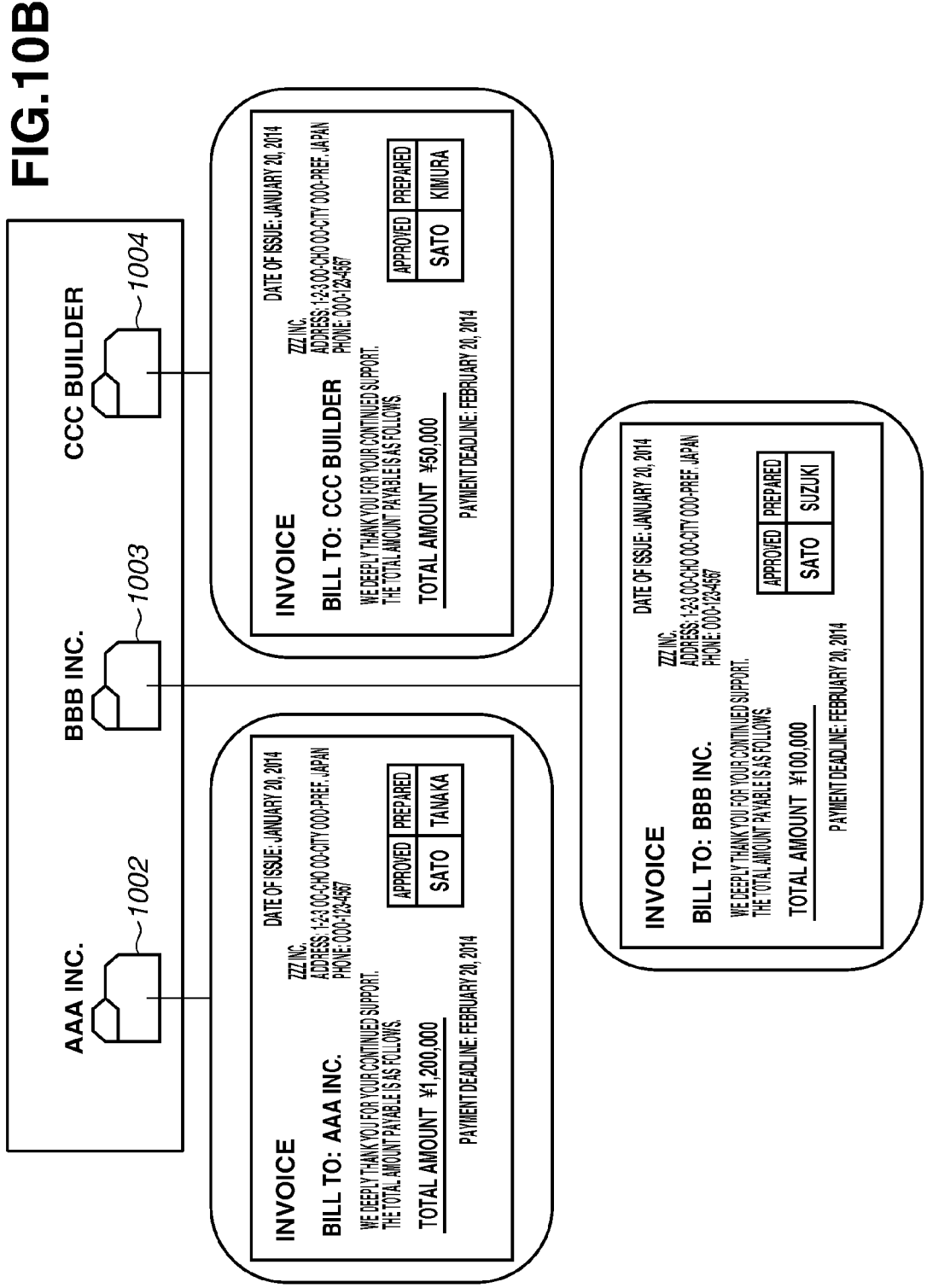

INVOICE   DATE OF ISSUE: JANUARY 20, 2014

ZZZ INC.
ADDRESS: 1-2-3 OO-CHO OO-CITY OOO-PREF. JAPAN
PHONE: OOO-123-4567

BILL TO: AAA INC.

WE DEEPLY THANK YOU FOR YOUR CONTINUED SUPPORT.
THE TOTAL AMOUNT PAYABLE IS AS FOLLOWS.

| APPROVED | PREPARED |
|----------|----------|
| SATO     | TANAKA   |

TOTAL AMOUNT ¥1,200,000

PAYMENT DEADLINE: FEBRUARY 20, 2014

1402

DETAILED STATEMENT   DATE OF ISSUE: JANUARY 20, 2014

BILL TO: AAA INC.

| CHARGE ITEMS | AMOUNT (YEN) |
|--------------|--------------|
| OCTOBER      | 400,000      |
| NOVEMBER     | 400,000      |
| DECEMBER     | 400,000      |
| TOTAL        | 1,200,000    |

ZZZ INC.
ADDRESS: 1-2-3 OO-CHO OO-CITY OOO-PREF. JAPAN
PHONE: OOO-123-4567

INVOICE

DATE OF ISSUE: JANUARY 20, 2014

ZZZ INC.
ADDRESS: 1-2-3 OO-CHO OO-CITY OOO-PREF. JAPAN
PHONE: OOO-123-4567

BILL TO: BBB INC.

WE DEEPLY THANK YOU FOR YOUR CONTINUED SUPPORT.
THE TOTAL AMOUNT PAYABLE IS AS FOLLOWS.

TOTAL AMOUNT ¥100,000

PAYMENT DEADLINE: FEBRUARY 20, 2014

| APPROVED | PREPARED |
|---|---|
| SATO | SUZUKI |

1404

DETAILED STATEMENT

DATE OF ISSUE: JANUARY 20, 2014

BILL TO: BBB INC.

| CHARGE ITEMS | AMOUNT (YEN) |
|---|---|
| DECEMBER | 100,000 |
| TOTAL | 100,000 |

ZZZ INC.
ADDRESS: 1-2-3 OO-CHO OO-CITY OOO-PREF. JAPAN
PHONE: OOO-123-4567

INVOICE

DATE OF ISSUE: JANUARY 20, 2014

ZZZ INC.
ADDRESS: 1-2-3 OO-CHO OO-CITY OOO-PREF. JAPAN
PHONE: OOO-123-4567

BILL TO: CCC BUILDER

WE DEEPLY THANK YOU FOR YOUR CONTINUED SUPPORT.
THE TOTAL AMOUNT PAYABLE IS AS FOLLOWS.

TOTAL AMOUNT ¥50,000

PAYMENT DEADLINE: FEBRUARY 20, 2014

| APPROVED | PREPARED |
|---|---|
| SATO | KIMURA |

1406

DETAILED STATEMENT

DATE OF ISSUE: JANUARY 20, 2014

BILL TO: CCC BUILDER

| CHARGE ITEMS | AMOUNT (YEN) |
|---|---|
| NOVEMBER | 50,000 |
| TOTAL | 50,000 |

ZZZ INC.
ADDRESS: 1-2-3 OO-CHO OO-CITY OOO-PREF. JAPAN
PHONE: OOO-123-4567

IMAGE PROCESSING APPARATUS FOR GENERATING A DIGITIZED DOCUMENT BY USING IMAGE DATA AND METHOD FOR CONTROLLING THE SAME

BACKGROUND OF THE INVENTION

Field of the Invention

The present invention relates to an image processing apparatus for generating a digitized document by using image data, and a method for controlling the image processing apparatus.

Description of the Related Art

An image processing apparatus is capable of digitizing image data acquired by reading a paper document, and of storing the digitized image data in a storage unit inside the apparatus. Conventionally, when storing digitized image data in this way, a character string composed of header information and a character string specific to the apparatus, and a serial number, is often applied to the file name of a digitized image data file and the folder name of a folder for storing the file. Therefore, when a user of the image processing apparatus wants to specify any folder name or file name for a storage target folder or file, respectively, the user needs to input a folder name or file name from an operation panel of the apparatus.

Japanese Patent Application Laid-Open No. 2005-56315 discusses a method for enhancing the correlation between the folder name of a folder for storing digitized image data or the file name of a digitized image data file and a document when the image data read by an image processing apparatus is digitized and stored, thus improving user's convenience.

According to this method, if a character or character string can be recognized at a predetermined position in a read document, the recognized character or character string is used as a file name. On the other hand, if a character or character string cannot be recognized, the read date and time are used as a file name.

However, in the method discussed in Japanese Patent Application Laid-Open No. 2005-56315, a recognized character or character string may not necessarily coincide with a folder name or file name the user wants to specify. Further, using the read date and time as a folder name or file name does not enhance the correlation between the content of image data acquired by reading a document and the file name of a file for storing the image data or the folder name of a folder for storing the file.

SUMMARY OF THE INVENTION

According to an aspect of the present invention, an image processing apparatus includes a specification unit configured to acquire first image data and second image data, and specify a character string out of character strings included in the first image data, and a storage unit configured to store the first image data and the second image data in one folder in a case where a character string in the second image data at a position corresponding to a position of the character string in the first image data specified by the specification unit coincides with the character string specified by the specification unit, and configured to store the first image data and the second image data in different folders in a case where the character string in the second image data at the position corresponding to the position of the character string in the first image data specified by the specification unit does not coincide with the character string specified by the specification unit.

According to the present invention, a folder name and a file name for managing a generated digitized document can be generated by using a character string intended by a user. As a result, it becomes possible to enhance the correlation between the content of input image data and the folder name or file name used when storing the input image data. Therefore, the present invention improves the efficiency of image data digitization operations and the recognizability after digitization, to facilitate management of digitized image data.

Further features of the present invention will become apparent from the following description of exemplary embodiments with reference to the attached drawings.

BRIEF DESCRIPTION OF THE DRAWINGS

FIGS. 4A and 4B illustrate an example of a character determination result.

FIGS. 5A to 5F illustrate examples of input image data.

FIGS. 6A, 6B, and 6C illustrate examples of display forms according to the first exemplary embodiment.

FIG. 9 is a block diagram illustrating a configuration of an image processing apparatus according to a second exemplary embodiment.

FIGS. 10A and 10B illustrate examples of file generation.

FIGS. 14A, 14B, and 14C illustrate examples of input image data according to a fourth exemplary embodiment.

DESCRIPTION OF THE EMBODIMENTS

Figure 1:
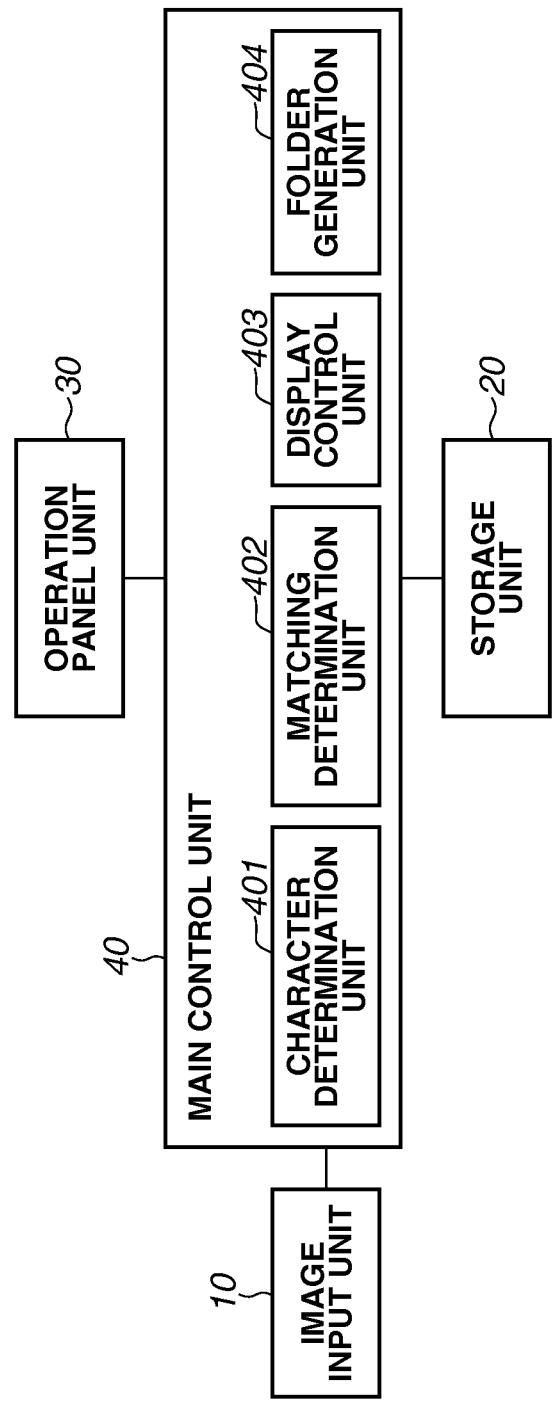
FIG. 1 is a block diagram illustrating a configuration of an image processing apparatus according to a first exemplary embodiment.
Figure 3:
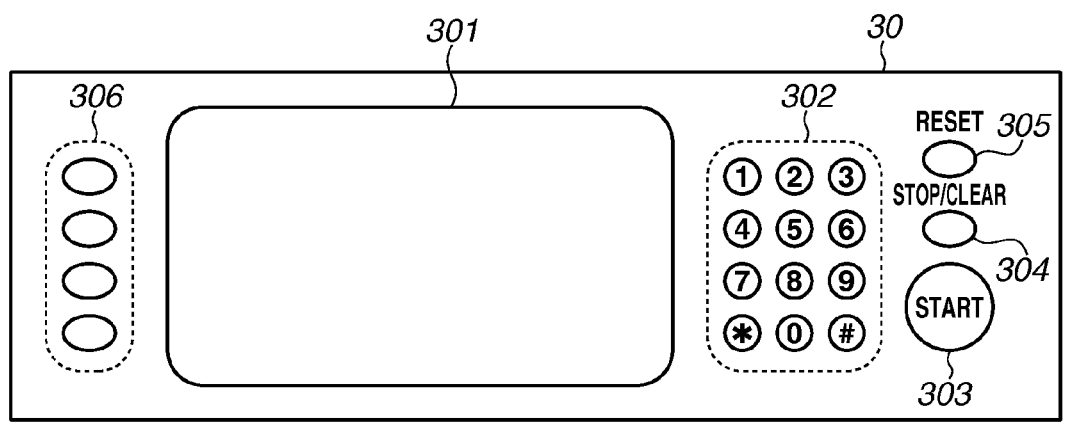
FIG. 3 illustrates a configuration of an operation panel unit.

A first exemplary embodiments of the present invention will be described below with reference to the accompanying drawings. FIG. 1 is a block diagram illustrating a configuration of an image processing apparatus required to implement the present exemplary embodiment. The image processing apparatus includes at least a main control unit 40, an image input unit 10, a storage unit 20, and an operation panel unit 30. Referring to FIG. 1, the image input unit 10 acquires image data by optically reading a paper document, or image data input via a communication network (not illustrated). The storage unit 20 stores the image data input by the image input unit 10 or control information for the main control unit 40. The operation panel unit 30 includes an input unit for giving an operation instruction to the image processing apparatus, and a display unit for displaying an operation status. FIG. 3 illustrates a detailed configuration of the operation panel unit 30. Referring to FIG. 3, a display portion 301 includes, for example, a touch panel. A numeric keypad 302 is used to set setting items related to operations. A start key 303 is pressed to give an instruction for starting operation to the image processing apparatus. A Stop key 304 is used to instruct the image processing apparatus to stop operation. A Reset key 305 is used to initialize settings made by using the numeric keypad 302. Operation mode setting keys 306 are used to instruct setting of the operation mode of the image processing apparatus. The above-described keys are not limited to hardware keys and may be software keys.

The main control unit 40 illustrated in FIG. 1 includes a central processing unit (CPU), a storage unit for storing a boot program of the CPU, a storage unit for storing intermediate data, and an input/output (I/O) interface (not illustrated). The main control unit 40 controls the image input unit 10, the storage unit 20, and the operation panel unit 30. The main control unit 40 includes a character determination unit 401 for determining a character included in image data input from the image input unit 10, and a matching determination unit 402 for determining a matched portion or a non-matched portion in consideration of layout positions of a plurality of input image data. The main control unit 40 further includes a display control unit 403 for controlling information to be displayed on the display portion 301 included in the operation panel unit 30 according to a determination result by the matching determination unit 402, and a folder generation unit 404 for generating a folder according to a selection of contents displayed under the control of the display control unit 403.

Figure 2:
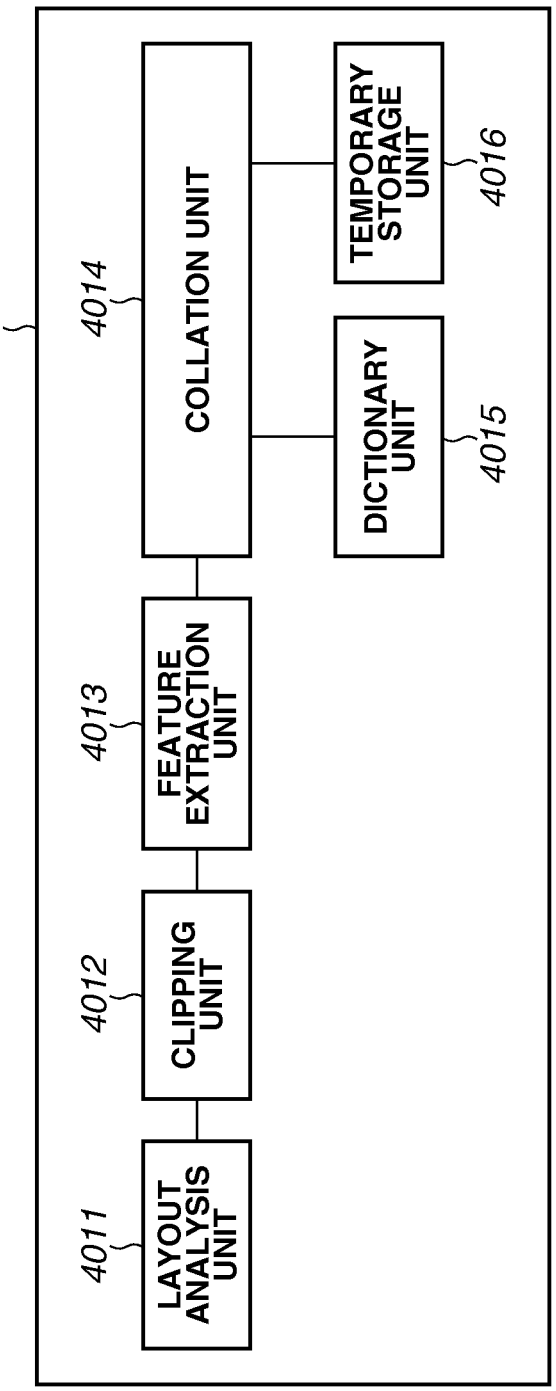
FIG. 2 is a block diagram illustrating a configuration of a character determination unit.

FIG. 2 is a block diagram illustrating an internal configuration of the character determination unit 401. The character determination unit 401 mainly includes an optical character reader (OCR). The OCR is used to optically read and recognize characters. When the input image data is data acquired by optically reading a paper document, the character determination unit 401 compares data clipped from the input image data with prestored patterns to perform character identification, and converts the image data into text data. Therefore, the character determination unit 401 includes processing units for configuring OCR, such as a layout analysis unit 4011, a clipping unit 4012, a feature extraction unit 4013, a collation unit 4014, a dictionary unit 4015, and a temporary storage unit 4016.

When the input image data is image data acquired via a communications network, the character determination unit 401 needs to include a text data analysis unit (not illustrated) for analyzing text data included in the image data.

The layout analysis unit 4011 divides the image data input from the image input unit 10 into character areas and image areas, analyzes the arrangement of blocks of character areas, and determines the order of character recognition. When a plurality of pages of image data having an identical format is input, the layout analysis unit 4011 analyzes that the result of arrangement of character areas and image areas included in the image data is identical for each page. Therefore, character recognition is performed in the same order for each piece of the image data.

More specifically, performing subsequent character data conversion according to an analysis result by the layout analysis unit 4011 enables determining matched and non-matched portions of characters and character strings for a plurality of pages.

The clipping unit 4012 divides a block of character areas detected by the layout analysis unit 4011 into lines, and further divides each line of the character area into characters. The feature extraction unit 4013 extracts features of each divided character, for example, line configurations in the vertical, the horizontal, and the oblique directions. The collation unit 4014 compares the features extracted by the feature extraction unit 4013 with information stored in the dictionary unit 4015 to convert character data into text data. The main control unit 40 stores in the temporary storage unit 4016 the text data determined by collation of the collation unit 4014. When the input image data is image data acquired via a communications network, text data is already included in the image data and therefore the relevant text data is stored in the temporary storage unit 4016.

A storage configuration of the temporary storage unit 4016 will be described below with reference to other drawings. FIG. 4A illustrates an example of acquired image data. The layout analysis unit 4011 analyzes character areas in the image data illustrated in FIG. 4A as a layout indicated by dashed lines (1) to (13). The clipping unit 4012 clips lines one by one in order of ascending order of the character block number, and further clips characters one by one. The feature extraction unit 4013 extracts character features from the clipped character data. The collation unit 4014 compares the features with information in the dictionary unit 4015 to convert the character data into text data. In a case where a data configuration to be stored in the temporary storage unit 4016 is one-row data placed between blank areas (white data areas) of the converted text data, the text data is stored in the temporary storage unit 4016 in a format illustrated in FIG. 4B.

Upon completion of processing for converting image data acquired by reading a document sheet into text data, the main control unit 40 generates intermediate file data (temporary file data) by using the text data stored in the temporary storage unit 4016. Then, the main control unit 40 stores the generated intermediate file data in the storage unit 20, in association with the text data read from the temporary storage unit 4016. If the text data stored in the temporary storage unit 4016 can be identified in order of storage by referring to the generated intermediate file data, it is not necessary to separately store in the storage unit 20 the text data read from the temporary storage unit 4016.

Operations of the main control unit 40 will be described below with reference to examples of image data. FIGS. 5A to 5C illustrate examples of image data input to the image input unit 10. Any one piece of the image data is acquired by reading one page of the image data having an identical document format (identical layout configuration) often seen in business form data (check data), with some different descriptions. For example, the character string "Invoice", the character string "BILL TO:" before the name of the charged company, and the name and address of the charging company are identical for all invoices. On the other hand, the charge amount and the content of "Prepared" are different for each invoice.

FIGS. 5D to 5F illustrate results of determination (stored as text data in the temporary storage unit 4016) performed by the character determination unit 401 on features extracted from the image data illustrated in FIGS. 5A to 5C, respectively. The main control unit 40 stores in the storage unit 20 the text data illustrated in FIGS. 5D to 5F stored in the temporary storage unit 4016 and the digitized intermediate file data of the image data illustrated in FIGS. 5A to 5C. In the present exemplary embodiment, after converting all of the character data extracted from the image data illustrated in FIGS. 5A to 5C input to the image input unit 10 into text data, the main control unit 40 reads the text data from the temporary storage unit 4016 and then stores the text data in the storage unit 20. However, control of the storage unit 20 by the main control unit 40 is not limited thereto. More specifically, the main control unit 40 may perform control to store in the storage unit 20 the text data stored in the temporary storage unit 4016 for each piece of the image data input to the image input unit 10.

After storing in the storage unit 20 the text data extracted from the image data input to the image input unit 10 and the intermediate files digitized from the input image data, the main control unit 40 performs matching determination control. The main control unit 40 performs matching determination control, via the matching determination unit 402, by comparing pieces of text data extracted from each piece of the input image data stored in the storage unit 20. The order of the text data stored in the storage unit 20 is based on the determination result by the layout analysis unit 4011 of the character determination unit 401. Therefore, even with identical text data, the matching determination unit 402 does not perform matching determination on text data stored in different order. More specifically, the order of the text data extracted from the input image data includes information about the position (position information) in the input image data of the text data. Therefore, if identical text data is extracted from different input image data and if the order of extraction is different, these pieces of text data can be determined to have different position information, i.e., they exist at different positions. Therefore, the matching determination unit 402 performs matching determination based on the content and order (position information) of the text data stored in the storage unit 20. Although, in the present exemplary embodiment, the position information of the text data extracted from the input image data is determined based on the order of text data extraction, the processing is not limited thereto. For example, the main control unit 40 may separately generate position information for the text data extracted from input image data, and store in the storage unit 20 the extracted text data, in association with the position information. Then, the main control unit 40 may perform matching determination or non-matching determination, via the matching determination unit 402, by using two pieces of information, i.e., the extracted text data and the position information.

Matching determination and non-matching determination will be described in detail below.

The following descriptions are based on the image data illustrated in FIG. 5A.

In this case, the text data corresponding to ranges 501, 503, and 505 illustrated in FIG. 5D (a determination result of text data extracted from the image data) coincides with the text data corresponding to ranges 501, 503, and 505, respectively, included in the determination results of the text data illustrated in FIGS. 5E and 5F.

Therefore, the portions corresponding to the ranges 501, 503, and 505 of the text data extracted from the input image data illustrated in FIGS. 5A to 5C can be determined to be identical (matched) in terms of the content and position information. On the other hand, the text data corresponding to ranges 502, 504, and 506 illustrated in FIG. 5D does not coincide with the text data corresponding to the ranges 502, 504, and 506, respectively, included in the determination results of the text data illustrated in FIGS. 5E and 5F. Therefore, the portions corresponding to the ranges 502, 504, and 506 of the text data extracted from the input image data illustrated in FIGS. 5A to 5C can be determined to be not identical (non-matched).

Matching determination by the matching determination unit 402 may not be based on full match of the text data stored in the storage unit 20. Since the conversion from character data to text data by OCR is based on the collation between features of character data extracted by the feature extraction unit 4013 and the data stored in the dictionary unit 4015, incorrect determination may arise for each individual character. Therefore, final matching determination may be performed based on the number of matching determinations for character strings. For example, when 8 out 10 characters of text data are matched, control may be performed to determine that the relevant character strings are matched.

Upon completion of matching determination control by the matching determination unit 402, the main control unit 40 performs display control via the display control unit 403. In display control, the main control unit 40 reflects matching determination results by the matching determination unit 402 to the intermediate file data acquired by digitizing the acquired image data. FIG. 6A illustrates a display form of the operation panel unit 30 when the input image data illustrated in FIG. 5A is displayed.

Referring to FIG. 6A, with character strings shaded with a shading pattern 601, descriptions at a position common to the image data of a plurality of business forms illustrated in FIGS. 5A to 5F are determined to be identical (matched) for all pieces of the image data by the matching determination unit 402. On the other hand, with character strings shaded with a shading pattern 602, descriptions at a position common to the image data of a plurality of business forms illustrated in FIGS. 5A to 5F are determined to be not identical (non-matched) for all pieces of the image data by the matching determination unit 402. Display formats for displaying matched and non-matched character strings are not limited thereto, and are any display forms as long as matched and non-matched character strings are distinguishable. For example, if the display portion 301 included in the operation panel unit 30 supports color displaying, matched and non-matched character strings may be displayed in color-coded form. Further, if the display portion 301 supports only monochrome display, character strings may be displayed in turn-on or blink display form.

Figure 6B:
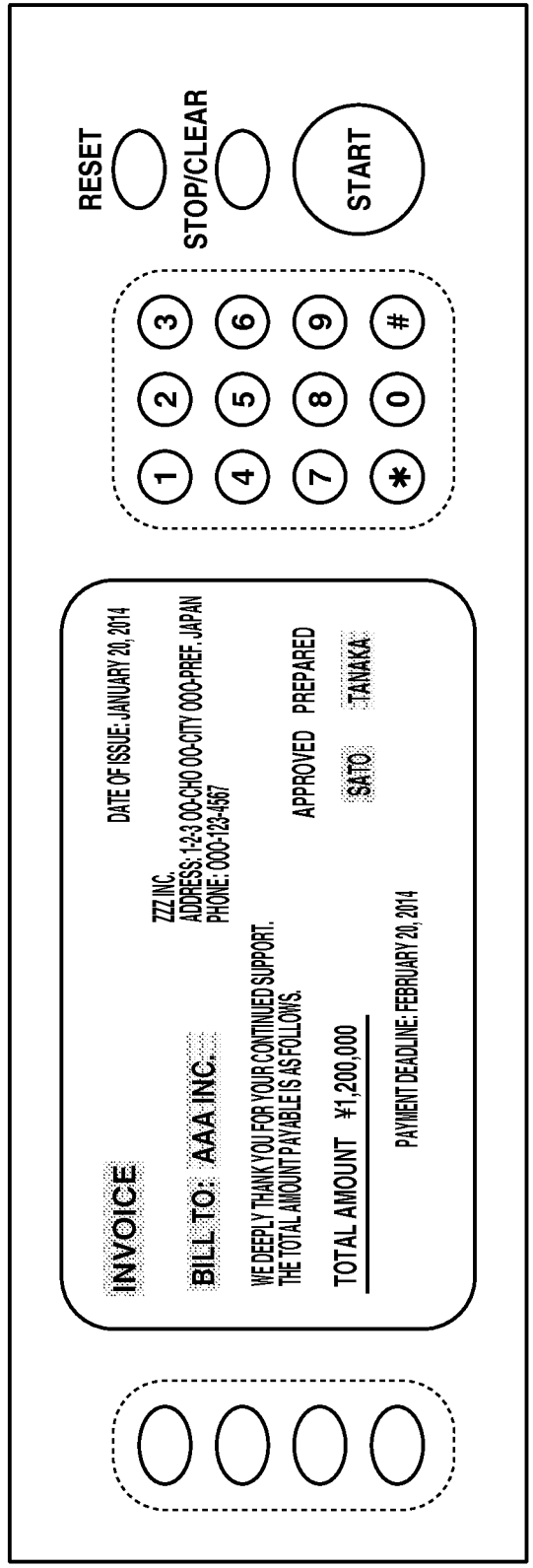

Further, not all of matched and non-matched character strings need to be displayed. For example, it is also possible to preset (register) in the storage unit 20 the character size (font size) and the length (number of characters) of display target matched and non-matched character strings, and display only matched and non-matched character strings corresponding to specified contents in distinguishable form. FIG. 6B illustrates an example of a display form in which matched and non-matched character strings are displayed for larger characters (font) than a predetermined threshold value or with the limited length of character strings. Since the relevant character strings are displayed for larger characters (font) than a predetermined threshold value, all of small character strings illustrated in FIG. 6A are not displayed. Further, since the length of the relevant character strings is limited, long character strings such as the date and fixed character strings are not displayed.

Figure 6C:
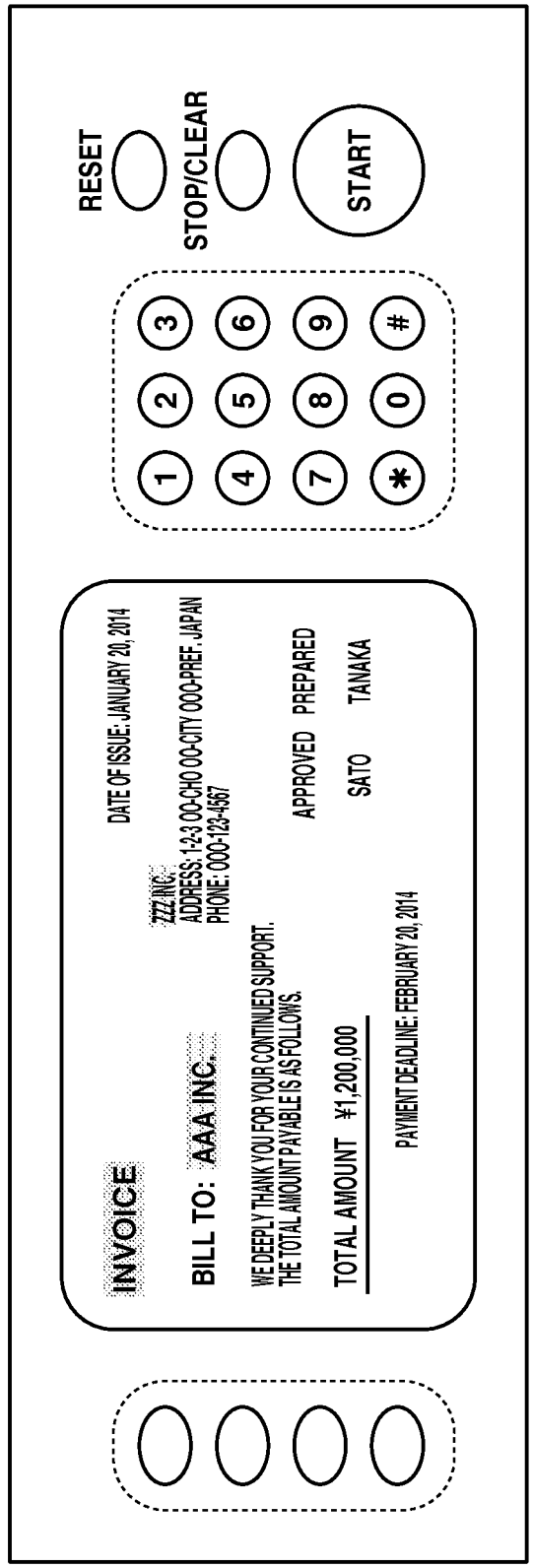

FIG. 6C illustrates an example of a display form in which keywords "Invoice" and "Inc." are specified in the storage unit 20 as display target matched and non-matched character strings, and only character strings including these specified keywords are displayed so that matched and non-matched character strings are distinguishable. Performing control in this way enables displaying only characteristic matched and non-matched character strings of the input image data, thus improving user's convenience at the time of selection.

Upon completion of display control by the display control unit 403, the main control unit 40 waits for a selection of a matched or non-matched portion displayed on the display portion 301. Subsequently, the main control unit 40 performs control in different ways depending on whether a matched portion is selected or a non-matched portion is selected. The method for selecting matched and non-matched portions depends on functions of the display portion 301. If the display portion 301 is a touch panel, the main control unit 40 switches the control method in response to the pressing of a matched or non-matched portion and the pressed coordinate position. On the other hand, if the display portion 301 is not a touch panel, the main control unit 40 switches the control method according to a result of a selection of a matched or non-matched portion through a key operation by using keys (not illustrated) included in the operation panel unit 30.

When the user selects a matched portion, the main control unit 40 performs control by using the selected character string determined as matched data. When the user selects a non-matched portion, the main control unit 40 performs control by using the character string determined as non-matched data corresponding to the selected position determined as a non-matched position. In the present exemplary embodiment, the main control unit 40 switches the control method for generating a folder for storing a result of digitizing the input image data, via the folder generation unit 404, according to whether a matched portion is selected or a non-matched portion is selected.

Figure 7A:
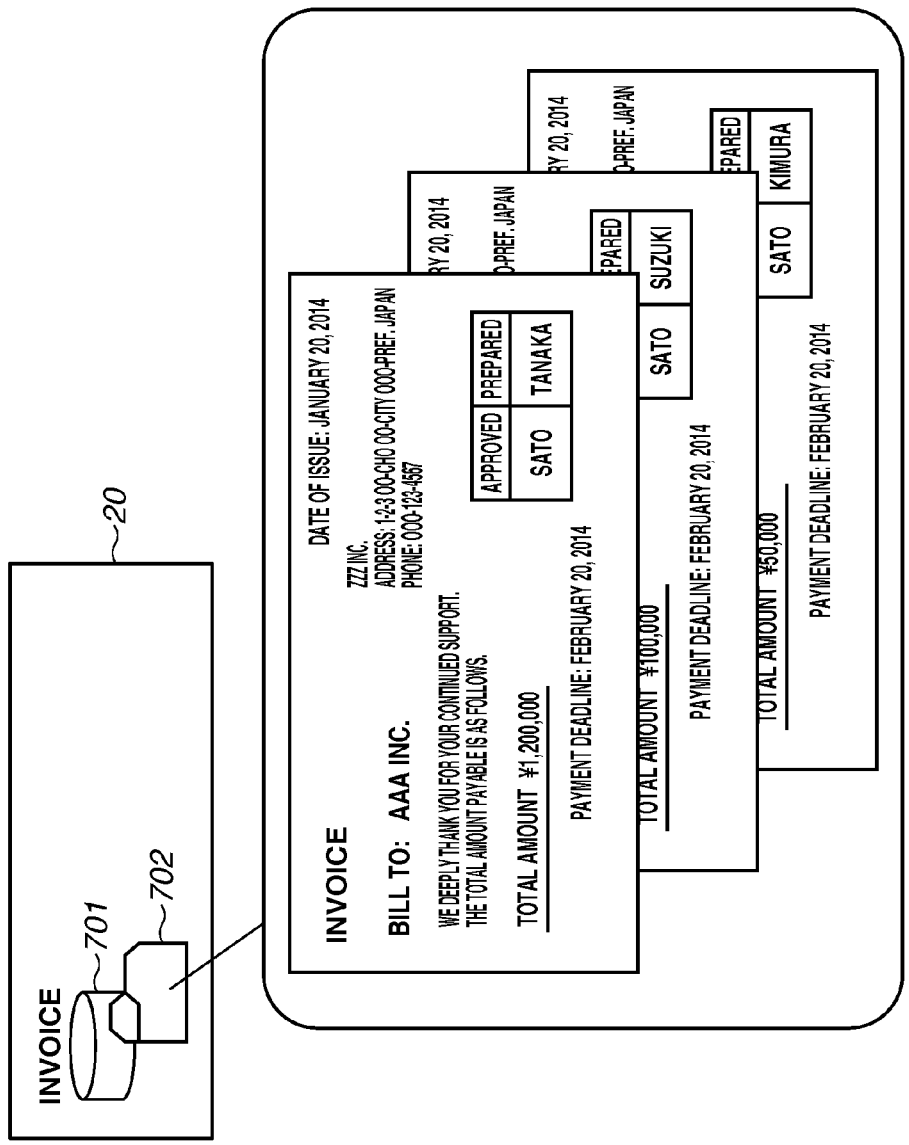
FIGS. 7A and 7B are examples of folder generation according to the first exemplary embodiment.

FIG. 7A illustrates a result of folder generation control performed by the folder generation unit 404 when the user selects the character string "Invoice" determined as matched data. When the user selects a character string determined as matched data out of a plurality of read image data, the folder generation unit 404 uses the selected character string as the name of a folder to be generated in the storage unit 20. For example, if the selected character string determined as matched data is "Invoice", the folder generation unit 404 uses "Invoice" as the name of a folder 701 to be generated. When the user selects a character string determined as matched data, the folder generation unit 404 stores in the generated folder an integrated file (one file) which integrates the digitized intermediate file data for the image data input by the image input unit 10. More specifically, the folder generation unit 404 integrates the intermediate files for the image data illustrated in FIGS. 5A, 5B, and 5C, and stores in the generated folder a final digitized file 702 by using the selected character string determined as matched data. It is assumed that the selected character string determined as matched data is used as a part of the file name of a file to be stored in the storage unit 20. For example, in the case of the above-described character string "Invoice", the resultant file name includes the character string "Invoice" and a serial number (for example, "Invoice_001"). Performing control in this way enables easily generating a folder name and a file name including a character string intended by the user.

Figure 7B:
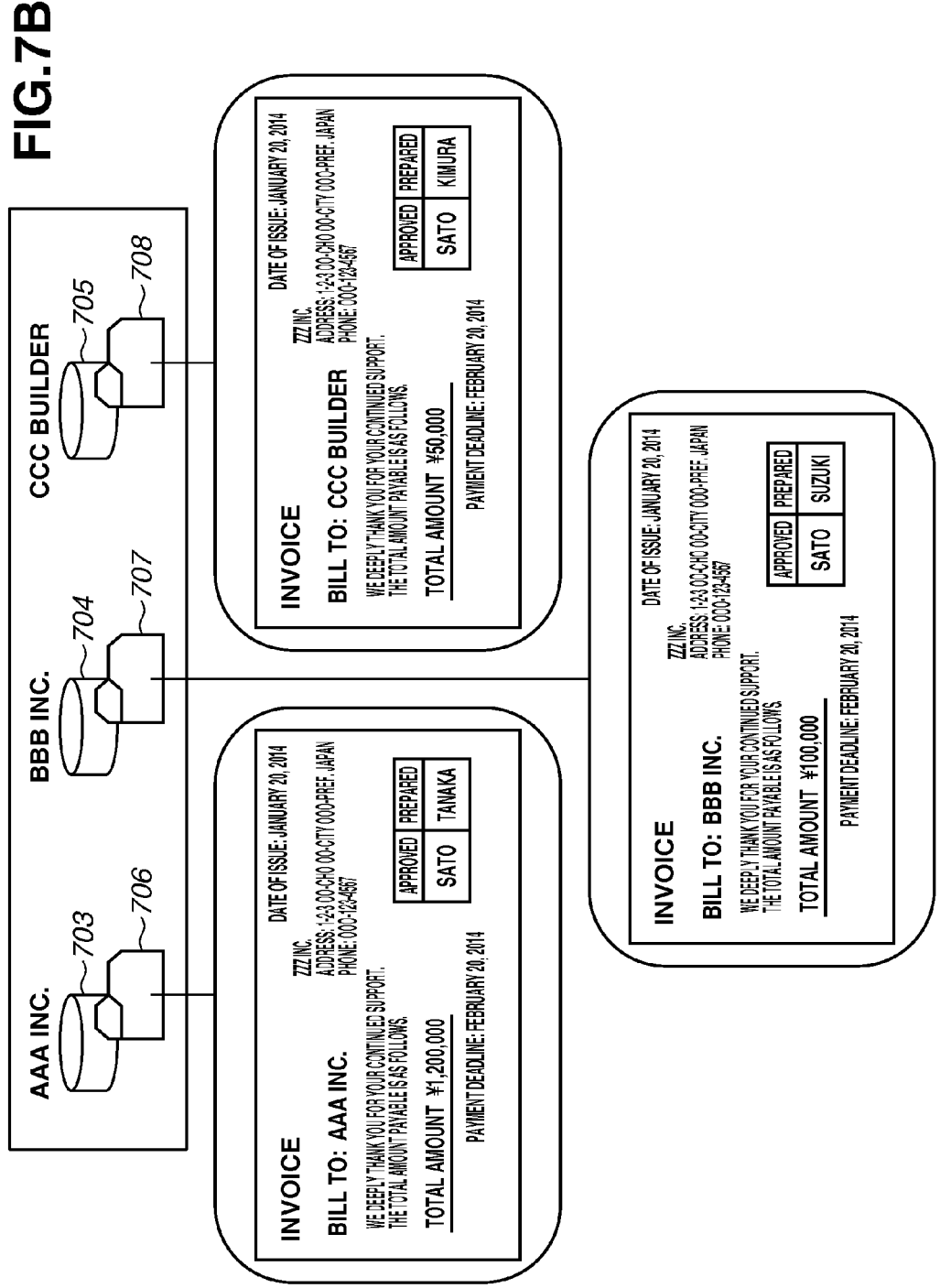

Control performed by the folder generation unit 404 when the user selects a non-matched portion out of a plurality of the read image data, is described. FIG. 7B illustrates a result of folder generation control performed by the folder generation unit 404 when the user selects the character string "AAA Inc." determined as non-matched data. When the user selects a character string determined as non-matched data, the folder generation unit 404 uses each character string existing at the selected character string position as the folder name of a folder to be generated in the storage unit 20. In the present exemplary embodiment, the selected character string determined as non-matched data is "AAA Inc." Therefore, the character string existing at the position of the character string "AAA Inc." in each piece of the image data, i.e., the character string existing after "BILL TO:" in each piece of the input image data will be used as the folder name of respective folders 703, 704, and 705. More specifically, folders having a folder name of "AAA Inc.", "BBB Inc.", and "CCC Builder" are generated. When the user selects a character string determined as non-matched data, the main control unit 40 stores digitized image data input by the image input unit 10 in the respective generated folders as different files.

More specifically, in the case of the input image data illustrated in FIG. 5A, the main control unit 40 stores digitized intermediate file data 706 for the image data illustrated in FIG. 5A in a folder having a folder name of "AAA Inc.". Similarly, in the case of the input image data illustrated in FIG. 5B, the main control unit 40 stores digitized intermediate file data 707 for the image data illustrated in FIG. 5B in a folder having a folder name of "BBB Inc.". Similarly, in the case of the input image data illustrated in FIG. 5C, the main control unit 40 stores digitized intermediate file data 708 for the image data illustrated in FIG. 5C in a folder having a folder name of "CCC Builder". Each character string existing at the selected position determined as a non-matched position is used as a part of the file name of a file in the respective generated folders. For example, in the case of the folder "AAA, Inc.", a file having a file name including "AAA, Inc." and a serial number (for example, "AAA Inc._001") is stored (after renaming the intermediate file data). Performing control in this way enables easily generating a folder name and a file name including a character string intended by the user.

Figure 8:
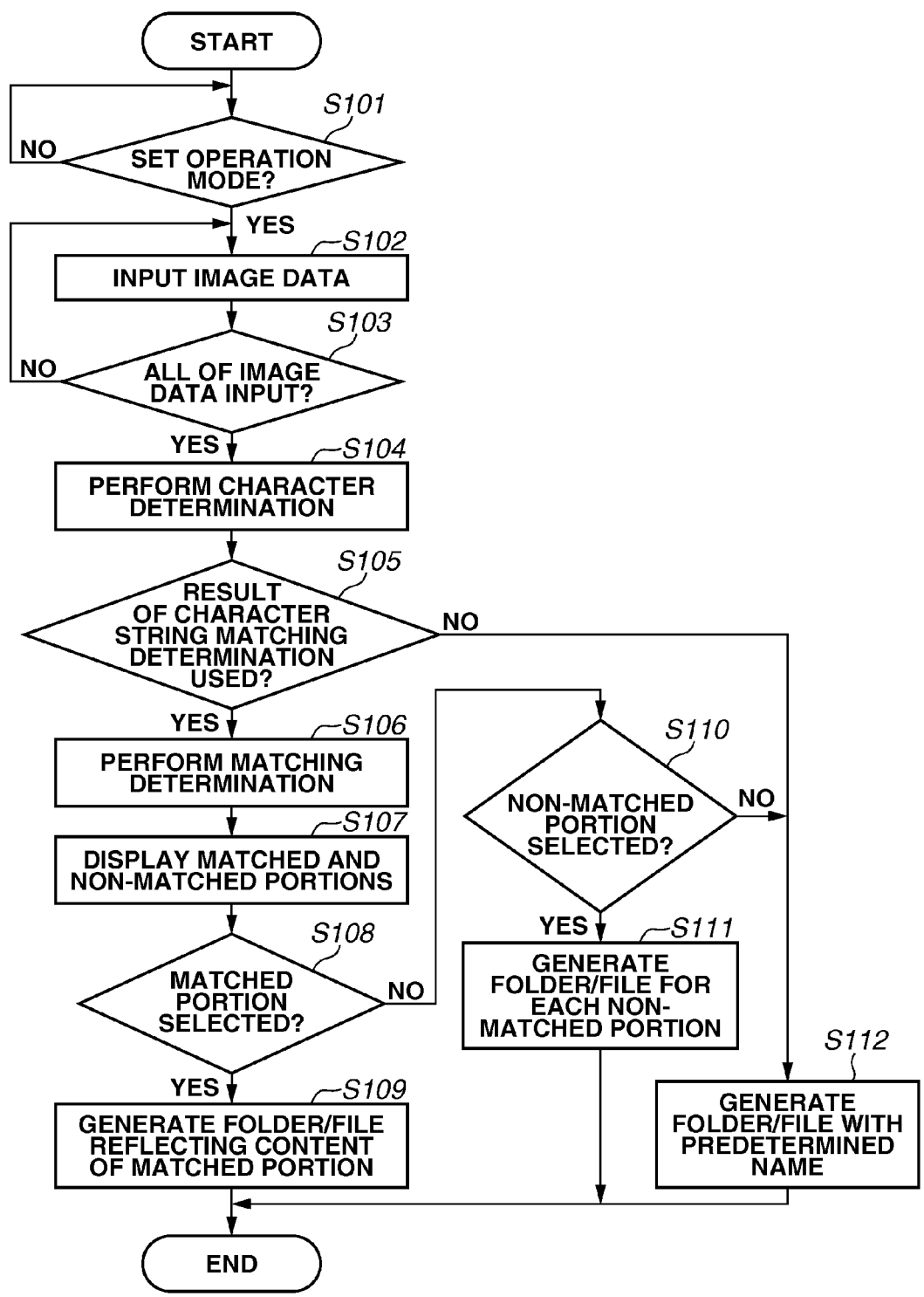
FIG. 8 is a flowchart illustrating a control flow according to the first exemplary embodiment.

A control flow performed by the main control unit will be described below. FIG. 8 is a flowchart illustrating a control flow according to the first exemplary embodiment. Processing in each step of this flowchart is implemented when a CPU (not illustrated) reads a computer-executable program describing the following procedures from a read only memory (ROM) (not illustrated) into a random access memory (RAM) (not illustrated), and executes the program.

When the user selects an operation mode for digitizing image data to be acquired (YES in step S101), the processing proceeds to step S102. In step S102, the image input unit 10 acquires image data. The acquired image data corresponds to scanned image data if the data is input through optical reading, or corresponds to received data if the data is input via a communication network. In step S103, the image input unit 10 determines whether image data of all pages has been input. When the image input unit 10 determines that image data of all pages has been input (YES in step S103), the processing proceeds to step S104. In step S104, the main control unit 40 performs character determination processing via the character determination unit 401. In the character determination processing, the character determination unit 401 performs layout analysis, data clipping, feature extraction, and collation processing on each piece of the image data input by the image input unit 10, and stores a result of collation.

In step S105, when the main control unit 40 determines that, when digitizing image data, the user-set operation mode does not use a result of matching determination on character strings at a position common to the image data of all pages (NO in step S105), the processing proceeds to step S112. In step S112, the main control unit 40 generates a folder with a predetermined folder name. The main control unit 40 stores in the generated folder a digitized file of which the file name includes the text data acquired by the character determination unit 401. On the other hand, in step S105, when the main control unit 40 determines that, when digitizing image data, the user-set operation mode uses a result of matching determination on character strings at a position common to the image data of all pages (YES in step S105), the processing proceeds to step S106. In step S106, the main control unit 40 performs matching determination processing via the matching determination unit 402. Upon completion of the matching determination processing via the matching determination unit 402, then in step S107, the display control unit 403 of the main control unit 40 displays the determination result on the display portion 301. More specifically, the display control unit 403 performs display control so that matched and non-matched portions are distinguishable between the acquired image data of a plurality of pages.

When the user selects a matched portion (YES in step S108), the processing proceeds to step S109. In step S109, the folder generation unit 404 of the main control unit 40 generates a folder reflecting the content of the selected matched portion, and stores in the generated folder a single file in which the intermediate files for the input image data of all pages are integrated. On the other hand, in step S108, when the user selects a non-matched portion (NO in step S108), the processing proceeds to step S110. In step S110, the main control unit 40 determines whether a non-matched portion is selected. If a non-matched portion is determined to have been selected (YES in step S110), the processing proceeds to step S111. In step S111, the folder generation unit 404 of the main control unit 40 generates a folder reflecting the content for each selected non-matched portion in each piece of the input image data, and stores a relevant intermediate file in each folder. Names of the intermediate files stored in steps S109 and S111 change according to a selection of matched and non-matched portions described above, respectively.

The generated folder may be stored in the storage unit 20, or stored in a memory connected to the image processing apparatus according to the present exemplary embodiment.

In the present exemplary embodiment, as described above, when digitizing image data configured in an identical format for a plurality of pages, such as a business form, folders are configured in a format according to the content of user selection (a selection of a matched/non-matched portion). Further, the file name and the file format of the digitized file to be stored in a folder also conform to the content of user selection (a selection of a matched/non-matched portion), thus improving user's convenience. Therefore, the present invention improves the efficiency of image data digitization operations and the recognizability after digitization, to facilitate management of digitized image data.

In the first exemplary embodiment, the folder configuration, the file configuration, the folder name, and the file name are suitably controlled according to the content of user selection. A second exemplary embodiment will be described below in a case where the file configuration and the file name are controlled according to the content of user selection.

FIG. 9 illustrates a configuration of an image processing apparatus required to implement the present exemplary embodiment.

Referring to FIG. 9, although elements having the same functions as those of the first exemplary embodiment are assigned an identical reference numerals, a processing unit specific to the present exemplary embodiment is only a file generation unit 405 included in the main control unit 40. Therefore, functions and operations of the image input unit 10, the storage unit 20, the operation panel unit 30, and the character determination unit 401, the matching determination unit 402, and the display control unit 403 included in the main control unit 40 are similar to the functions and operations according to the first exemplary embodiment. On the other hand, in the present exemplary embodiment, operations after display control by the display control unit 403 included in the main control unit 40 differs from operations according to the first exemplary embodiment. More specifically, processing performed in the present exemplary embodiment is characterized in control after selection of a matched or non-matched portion by the user. Therefore, control when a matched portion is selected and control when a non-matched portion is selected will be described below. The following descriptions are based on the input image data illustrated in FIGS. 5A to 5C.

Figure 10A:
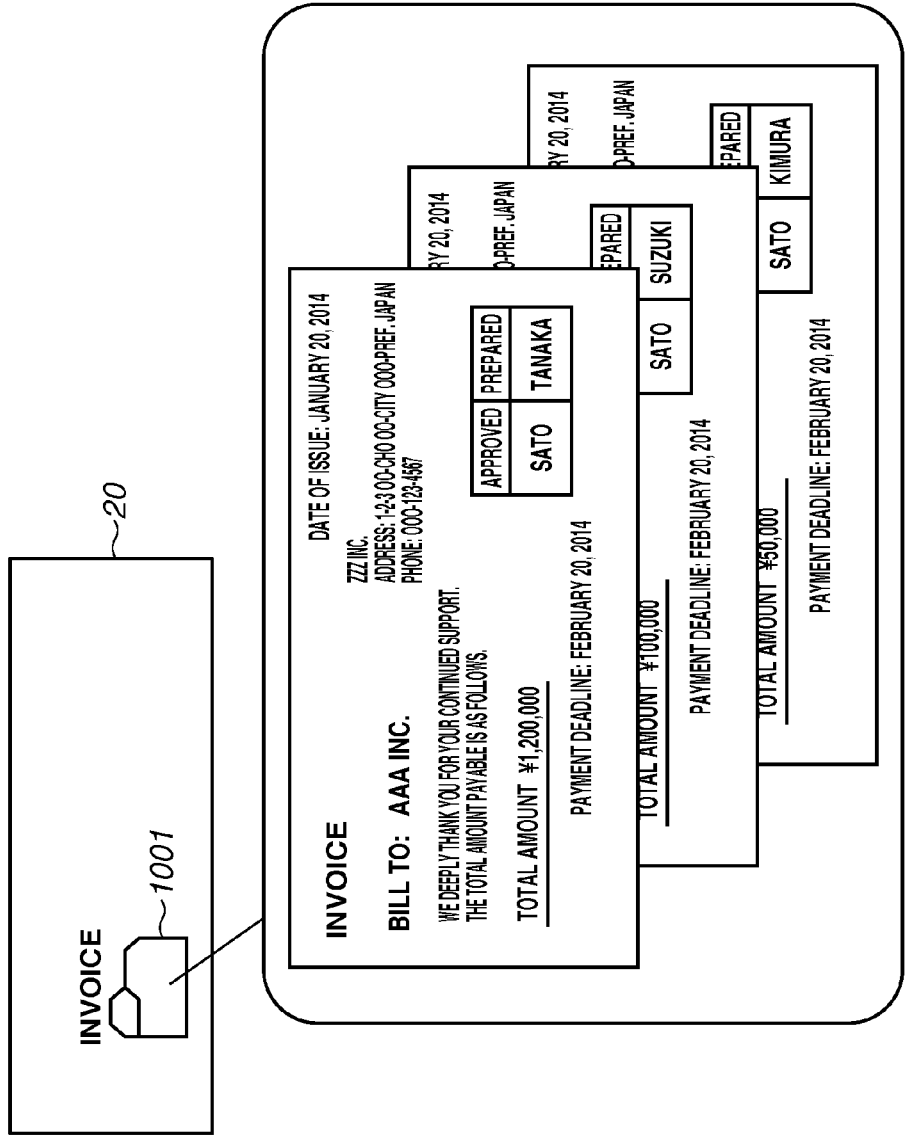

FIGS. 10A and 10B illustrate methods for managing digitized image data files according to the present exemplary embodiment.

FIG. 10A illustrates a result of file generation control performed by the file generation unit 405 when the user selects the character string "Invoice" determined as matched data. When the user selects a character string determined as matched data, the file generation unit 405 uses the selected character string as the file name of a file to be generated in the storage unit 20. For example, if the selected character string determined as matched data is "Invoice", "Invoice" is used as the file name of a file 1001. Further, the file generation unit 405 stores in integral form the intermediate files for the image data illustrated in FIGS. 5A, 5B, and 5C generated by the character determination unit 401. Performing control in this way enables easily generating a file name by using a character string intended by the user.

Control by the file generation unit 405 when the user selects a non-matched portion will be described below. FIG. 10B illustrates a result of folder generation control performed by the file generation unit 405 when the user selects the character string "AAA Inc." determined as non-matched data. When the user selects a character string determined as non-matched data, the folder generation unit 405 uses each character string existing at the selected character string position as the file name of a file to be generated in the storage unit 20. In the descriptions, the selected character string determined as non-matched data is "AAA Inc.". Therefore, the character strings existing at the position of the character string "AAA Inc." in each piece of the image data, i.e., the character strings existing after "BILL TO:" in each piece of the input image data are assumed to be the file names of respective files 1002, 1003, and 1004.

When the user selects a character string determined as non-matched data, the main control unit 40 stores the digitized image data input by the image input unit 10 as different files.

More specifically, in the case of the input image data illustrated in FIG. 5A, the main control unit 40 stores a digitized file for the image data illustrated in FIG. 5A with a file name of "AAA Inc.". Likewise, in the case of the input image data illustrated FIG. 5B, the main control unit 40 stores a digitized file for the image data illustrated in FIG. 5B with a file name of "BBB Inc.". Likewise, in the case of the input image data illustrated in FIG. 5C, the main control unit 40 stores a digitized file for the image data illustrated in FIG. 5C with a file name of "CCC Builder". More specifically, in the present exemplary embodiment, intermediate files for respective pieces of the input image data is renamed and stored. Performing control in this way enables easily generating a file name by using a character string intended by the user.

Figure 11:
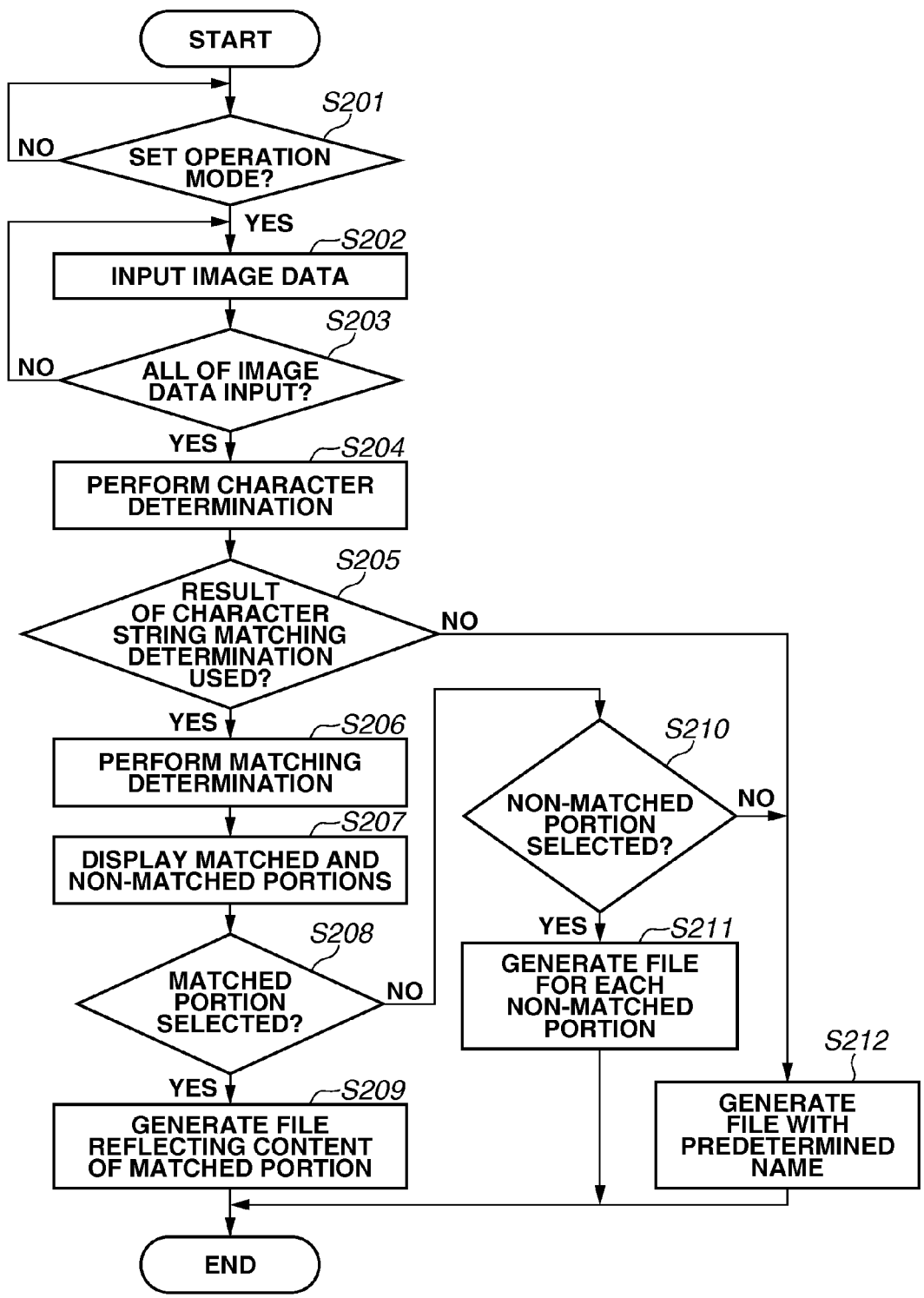
FIG. 11 is a flowchart illustrating a control flow according to the second exemplary embodiment.

A control flow of the main control unit 40 will be described below. FIG. 11 is a flowchart illustrating a control flow according to the present exemplary embodiment. Processing in each step of this flowchart is implemented when a CPU (not illustrated) reads a computer-executable program describing the following procedures from a read only memory (ROM) (not illustrated) into a random access memory (RAM) (not illustrated), and executes the program.

In step S201, when the user selects an operation mode for digitizing image data to be acquired (YES in step S201), the processing proceeds to step S202. In step S202, the image input unit 10 acquires image data. The image data to be acquired corresponds to scanned image data if the data is input through optical reading, or corresponds to received data if the data is input via a communication network. If the image input unit 10 determines that image data of all pages has been input (YES in step S203), the processing proceeds to step S204. In step S204, the main control unit 40 performs character determination processing via the character determination unit 401. In the character determination processing, the character determination unit 401 performs layout analysis, data clipping, feature extraction, and collation processing on each piece of the image data input by the image input unit 10, and stores a result of collation.

In step 205, when the main control unit 40 determines that, when digitizing image data, the user-set operation mode does not use a result of matching determination on character strings at a position common to the image data of all pages (NO in step S205), the processing proceeds to step S212. In step S212, the main control unit 40 stores a file to be generated with a predetermined file name. On the other hand, in step S205, when the main control unit 40 determines that, when digitizing image data, the user-set operation mode uses a result of matching determination on character strings at a position common to the image data of all pages (YES in step S205), the processing proceeds to step S206. In step S206, the main control unit 40 performs matching determination processing via the matching determination unit 402. Upon completion of the matching determination processing via the matching determination unit 402, the processing proceeds to step S207. In step S207, the display control unit 403 of the main control unit 40 performs display control on matched and non-matched portions.

In step S208, when the user selects a matched portion (YES in step S208), the processing proceeds to step s209. In step S209, the file generation unit 405 of the main control unit 40 generates a file reflecting the content of the selected matched portion. The generated file is a single file in which the intermediate files for the input image data of all pages are integrated. On the other hand, in step S208, when the user selects a non-matched portion (NO in step S208), the processing proceeds to step S210. In step S210, the display control unit 403 determines whether the user-selected portion is a non-matched portion. In step S210, when the user-selected position is determined as a non-matched portion (YES in step S210), the processing proceeds to step S211. In step S211, the file generation unit 405 of the main control unit 40 generates a file reflecting the content of each selected non-matched portion in each piece of the input image data. The name of each file stored in steps S209 and S211 is a name corresponding to a selection of matched and non-matched portions described above.

The generated file may be stored in the storage unit 20, or stored in a memory connected to the image processing apparatus according to the present exemplary embodiment.

In the present exemplary embodiment, as described above, when digitizing image data configured in an identical format for a plurality of pages, acquired by reading a business form, files are configured in a format according to the content of user selection (a selection of a matched/non-matched portion). Further, the file name of the digitized file to be stored in a folder also conform to the content of user selection (a selection of a matched/non-matched portion), thus improving user's convenience. Therefore, the present invention improves the efficiency of image data digitization operations and the recognizability after digitization, to facilitate management of digitized image data.

A third exemplary embodiment of the present invention will be described below. The present exemplary embodiment relates to control in a case where an operation mode is preset when digitizing a plurality of image data configured in an identical format. One operation mode generates an integrated file (one file) in which files are integrated, and the other operation mode generates individual files. The configuration of the image processing apparatus according to the present exemplary embodiment is illustrated in FIG. 1. The image processing apparatus includes the image input unit 10, the storage unit 20, the operation panel unit 30, and the main control unit 40. Subsequent descriptions will be made on the premise that image data input to the image input unit 10 is the image data illustrated in FIGS. 5A to 5C.

Figure 12:
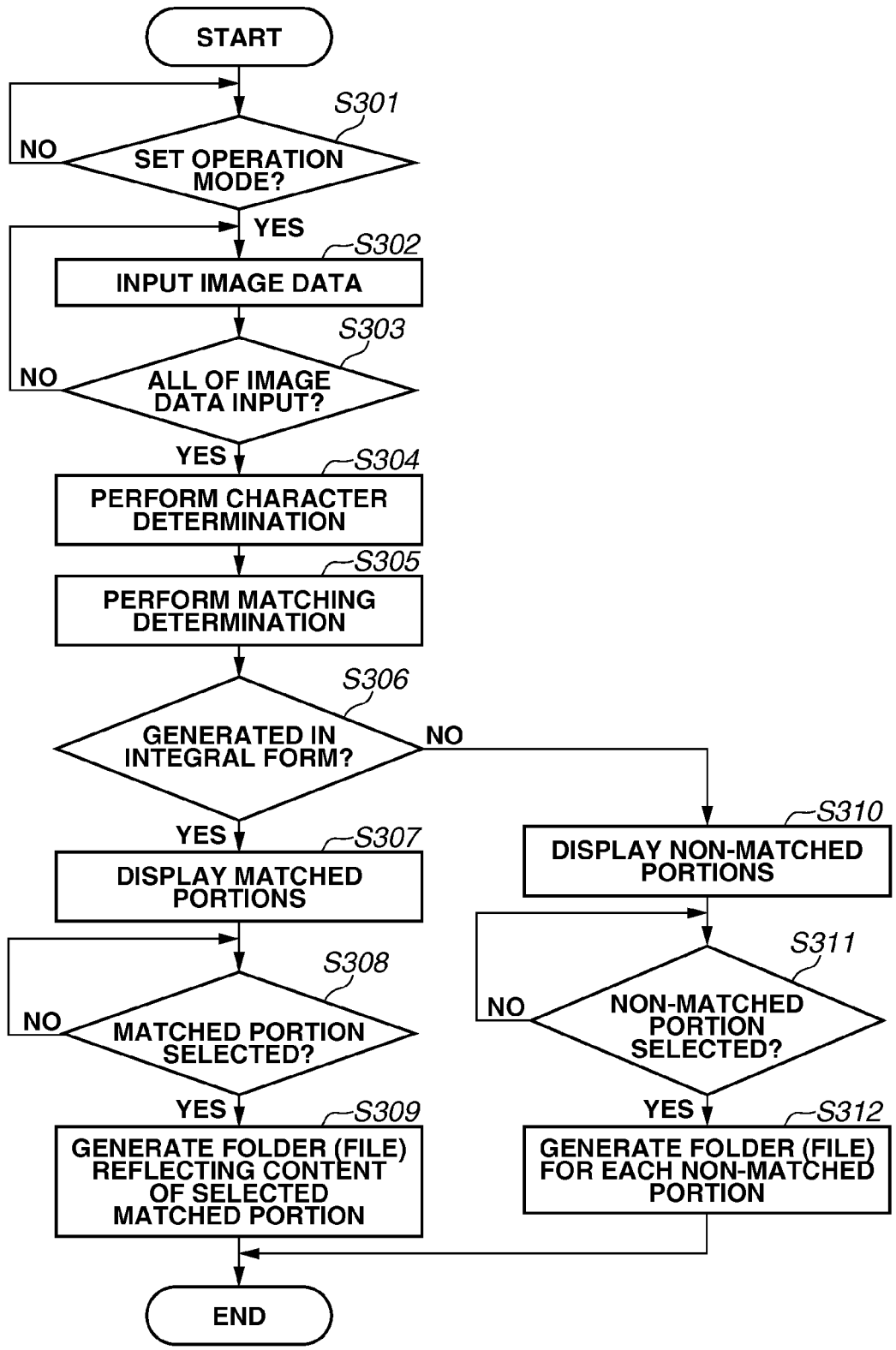
FIG. 12 is a flowchart illustrating a control flow according to a third exemplary embodiment.

A control flow according to the present exemplary embodiment will be described below with reference to FIG. 12. FIG. 12 is a flowchart illustrating a control flow according to the present exemplary embodiment. Processing in each step of this flowchart is implemented when a CPU (not illustrated) reads a computer-executable program describing the following procedures from a read only memory (ROM) (not illustrated) into a random access memory (RAM) (not illustrated), and executes the program.

In step S301, when digitizing the image data to be acquired, the user sets an operation mode for digitizing the acquired image data of all pages as integrated data, or an operation mode for digitizing the acquired image data of all pages as individual data. In step S301, if an operation mode is determined to have been selected (YES in step S301), the processing proceeds to step S302. In step S302, the image input unit 10 receives image data. Similar to the first and the second exemplary embodiments, the image data to be acquired corresponds to scanned image data if the data is input through optical reading, or corresponds to received data if the data is input via a communication network. In step S303, the image input unit 10 continuously receives image data until all of the image data is input.

In step S303, if the image input unit 10 determines that image data of all pages has been input (YES in step S303), the processing proceeds to step S304. In step S304, the main control unit 40 performs character determination processing via the character determination unit 401. In the character determination processing, the character determination unit 401 performs layout analysis, data clipping, feature extraction, and collation processing on each piece of the image data input by the image input unit 10, and stores a result of collation.

Upon completion of the character determination processing via the character determination unit 401, the processing proceeds to step S305. In step S305, the matching determination unit 402 of the main control unit 40 performs matching determination processing. In step S306, when the user-set operation mode is an operation mode for integrating results of the digitized input image data into one file (storing the acquired image data of all pages as one file) (YES in step S306), the processing proceeds to step S307. In step S307, the main control unit 40 displays character strings determined as matched data by the matching determination unit 402, in selectable form through processing by the display control unit 403.

Figure 13A:
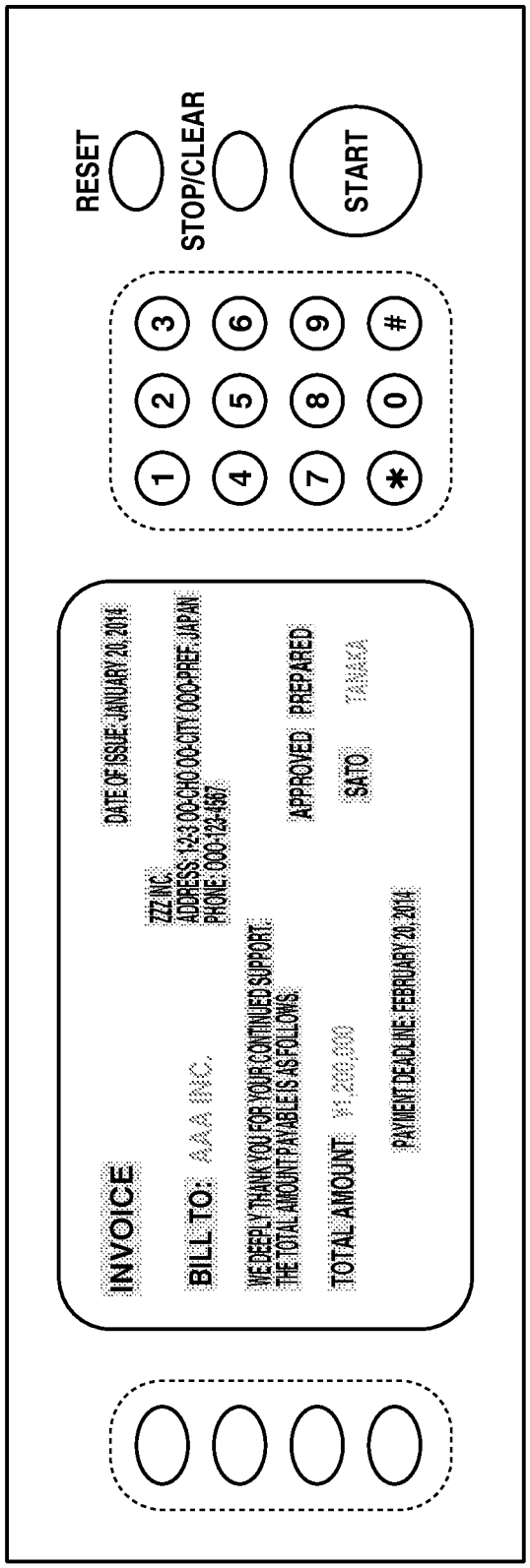
FIGS. 13A and 13B illustrate examples of display forms according to the third exemplary embodiment.

FIG. 13A illustrates an example of the relevant display form of the operation panel unit 30. Referring to FIG. 13A, shaded character strings are character strings determined as matched data in the input image data illustrated in FIGS. 5A, 5B, and 5C by the matching determination unit 402. The shaded character strings are selectable by the user in the operation mode selected in step S306. Grayed character strings are character strings determined as non-matched data in the input image data by the matching determination unit 402, and are not selectable by the user in the operation mode selected in step S306. User-selectable character strings determined as matched data may be displayed in color-coded form, or in turn-on or blink display form.

When the user selects a character string determined as matched data (YES in step S308), the processing proceeds to step S309. In step S309, the main control unit 40 generates in the storage unit 20 a folder with a folder name including the selected character string. Then, the main control unit 40 integrates the intermediate files for the image data illustrated in FIGS. 5A, 5B, and 5C stored in the storage unit 20 into one file, and stores in the generated folder the integrated file with a file name including the selected matched character string. For example, when the user selects the character string "Invoice" determined as matched data, the main control unit generates a folder with a folder name of "Invoice", integrates the intermediate files for the image data illustrated in FIGS. 5A, 5B, and 5C into one file, and stores the integrated file with a file name of "Invoice_001."

On the other hand, in step S306, when the user-set operation mode is an operation mode for individually generating results of digitizing the input image data of all pages (NO in step S306), the processing proceeds to step S310. In step S310, the main control unit 40 displays character strings determined as non-matched data by the matching determination unit 402, in selectable form through processing by the display control unit 403.

Figure 13B:
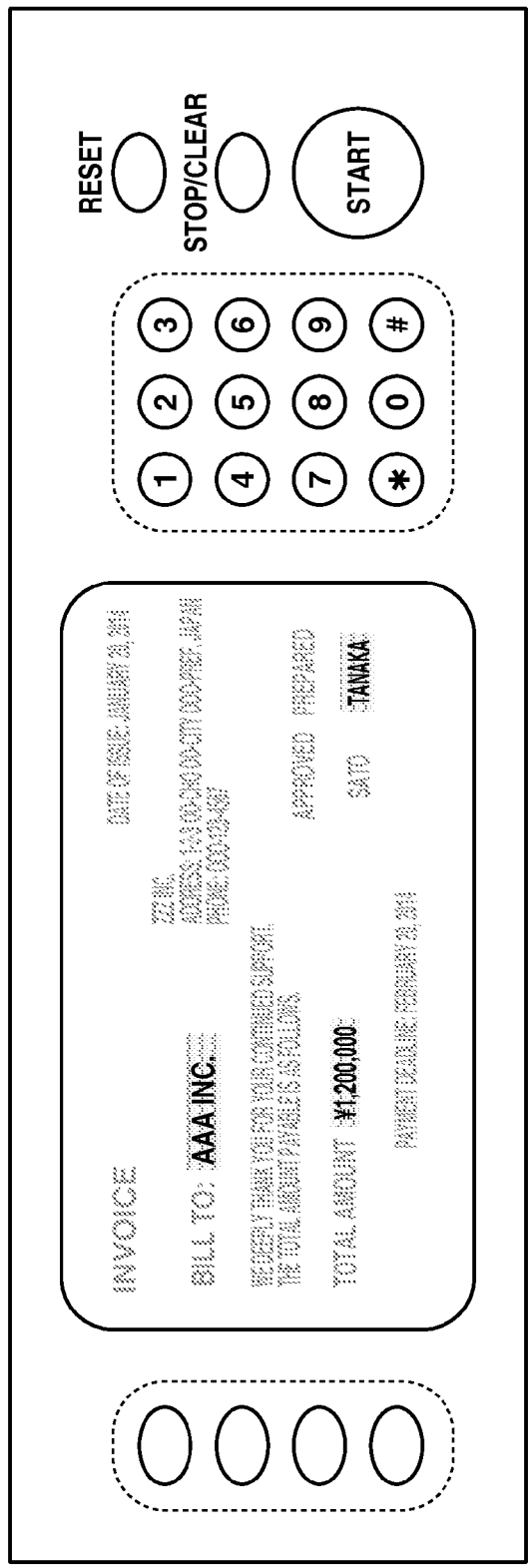

FIG. 13B illustrates an example of the relevant display form of the operation panel unit 30. Referring to FIG. 13B, shaded character strings are character strings determined as the input image data, i.e., non-matched data in the input image data by the matching determination unit 402. The shaded character strings are selectable by the user in the operation mode selected in step S306. Grayed character strings are character strings determined as matched data in all pieces of the image data illustrated in FIGS. 5A, 5B, and 5C by the matching determination unit 402, and are not selectable by the user in the operation mode selected in step S306. User-selectable character strings determined as non-matched data may be displayed in color-coded form, or in turn-on or blink display form.

In step S311, when the user selects a character string determined as non-matched data (YES in step S311), then the processing proceeds to step S312. In step S312, the main control unit 40 generates folders with folder names including respective character strings at the selected non-matched character string position in the input image data, and stores generated files in respective folders.

The generated folders (files) may be stored in the storage unit 20, or stored in a memory connected to the image processing apparatus according to the present exemplary embodiment.

More specifically, the main control unit 40 stores the intermediate files for the image data illustrated in FIGS. 5A, 5B, and 5C in the corresponding folders. For example, when the user selects the character string "AAA Inc." determined as non-matched data, the main control unit 40 generates folders with folder names of "AAA Inc.", "BBB Inc.", and "CCC Builder." The main control unit 40 renames the intermediate files for the image data illustrated in FIGS. 5A, 5B, and 5C to "AAA Inc._011", "BBB Inc._001", and "CCC Builder_001", respectively, and stores the intermediate files in the corresponding folders.

In the present exemplary embodiment, not all of character strings determined as matched data need to be displayed on the display portion 301, and not all of character strings determined as non-matched data need to be displayed on the display portion 301. For example, it is possible to preset in the storage unit 20 the character size (font size) and the length (number of characters) of display target matched and non-matched character strings, and display only matched and non-matched character strings corresponding to the specified content. It is also possible to pre-register keywords in the storage unit 20, and display only matched and non-matched character strings corresponding to the pre-registered keywords.

As described above, in the present exemplary embodiment, character strings determined as matched data or character strings determined as non-matched data are used as folder name and file name candidates according to the preset operation mode, thus improving user's convenience. Therefore, the present invention improves the efficiency of image data digitization operations and the recognizability after digitization, to facilitate management of digitized image data.

In the first to the third exemplary embodiments, all pages of the input image data have an identical format. However, not all pages of the input image data may have an identical format.

For example, FIGS. 14A, 14B, and 14C illustrate examples of specific input images. A set of an Invoice 1401 to "AAA Inc." and a Detailed Statement 1402 forms one document. A set of an Invoice 1403 to "BBB Inc." and a Detailed Statement 1404 forms one document. A set of an Invoice 1405 to "CCC Builder" and a Detailed Statement 1406 forms one document. Not all pages have an identical format in this way.

When inputting a document as illustrated in FIGS. 14A, 14B, and 14C, the user specify 2 pages in a page count setting area (not illustrated) included in the main control unit 40. Thus, the main control unit 40 compares the Invoices 1401, 1403, and 1405. Then, the main control unit 40 stores these documents on the premise that each document includes 2 pages and is stored as one file. When there is no non-matched portion in the result of image comparison, it is also possible to perform comparison on another page in the documents.

Thus, the main control unit 40 performs comparison on each page of the documents including a plurality of pages.

Specified pages may be compared in this way, or other methods may be used to determine comparison target pages. For example, based on the image feature amount, the main control unit 40 calculates the degree of similarity of subsequent pages for the starting page of the input image data to determine whether each page is a similar page. With the documents illustrated in FIGS. 14A, 14B, and 14C, the Invoices 1403 and 1405 similar to the Invoice 1401 may be selected as similar pages, and handled as comparison target pages. Further, not only similar pages but also the last pages in the documents may be handled as comparison target pages for matching and non-matching determination. Further, there may be a case where comparison target positions are not an identical position on respective images. Therefore, before performing comparison, a document portion before the trailing edge margin of the last page image may be aligned with the position of a portion where the trailing edge margin is formed.

As described above, even in a case of digitization of image data including a plurality of pages not having an identical format, specified pages and characteristic pages are handled as comparison target pages.

Then, for these comparison target pages, folders or files are configured on a document basis in a format according to the content of user selection (a selection of a matched/non-matched portion). Further, the names of folders and files to be stored also conform to the content of user selection, thus improving user's convenience.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-086611, filed Apr. 18, 2014, and No. 2014-246330, filed Dec. 4, 2014, which are hereby incorporated by reference herein in their entirety.

What is claimed is:

1. An image processing apparatus comprising:
an input unit configured to input first image data and second image data, the first image data and the second image data having a same layout;
an extraction unit configured to extract text data of character strings contained in the first image data and information about position of the character strings in the first image data, and extract text data of character strings contained in the second image data and information about position of the character strings in the second image data
a receiving unit configured to receive, from a user, a specifying of one character string out of the character strings contained in the first image data;
a determination unit configured to determine whether a character string at a position, in the second image data having the same layout as the first image data, common to the first position in the first image data matches the one character string, the specifying of which has been received by the receiving unit, using the text data and the information about the position of the text data extracted, by the extraction unit, from the first image data and the text data and the information about the position of the text data extracted, by the extraction unit, from the second image data; and
a storage control unit configured to perform control so as to store, in a case where the determination unit determines that the character string at the position, in the second image data, common to the first position in the first image data matches the one character string, the first image data and the second image data in one folder of which a name includes the character string received by the receiving unit and configured to perform control so as to store, in a case where the determination unit determines that the character string at the position, in the second image data, common to the first position in the first image data does not match the one character string, the first image data and the second image data in different folders,
wherein at least one of the input unit, the extraction unit, the receiving unit, the determination unit, and the storage control unit is implemented by one or more processors.

2. The image processing apparatus according to claim 1, wherein, in a case where input image data is to be stored by the storage unit using different folders, the first image data is stored in a folder having a name including the character string received by the receiving unit, and the second image data is stored in a folder having a name including the character string at the position in the second image data common to the first position in the first image data having the character string received by the receiving unit.

3. An image processing apparatus comprising:
an input unit configured to input first image data and second image data, the first image data and the second image data having a same layout;
an extraction unit configured to extract text data of character strings contained in the first image data and information about position of the character strings in the first image data, and extract text data of character strings contained in the second image data and information about position of the character strings in the second image data;
a receiving unit configured to receive, from a user, a specifying of one character string out of the character strings contained in the first image data;
a determination unit configured to determine whether a character string at a position, in the second image data having the same layout as the first image data, common to the first position in the first image data matches the one character string, the specifying of which has been received by the receiving unit, using the text data and the information about the position of the text data extracted, by the extraction unit, from the first image data and the text data and the information about the position of the text data extracted, by the extraction unit, from the second image data; and
a storage control unit configured to perform control so as to store, in a case where the determination unit determines that the character string at the position, in the second image data, common to the first position in the first image data matches the one character string, the first image data and the second image data in one file of which a name includes the character string received by the receiving unit and configured to perform control so as to store, in a case where the determination unit determines that the character string at the position, in the second image data, common to the first position in the first image data does not match the one character string, the first image data and the second image data in different files, wherein at least one of the input unit, the extraction unit, the receiving unit, and the determination unit is implemented by a processor.

4. The image processing apparatus according to claim 3, wherein, in a case where input image data is to be stored as different files by the storage unit, the first image data is stored as a file having a name including the character string received by the receiving unit, and the second image data is to be stored as a file having a name including the character string at the position in the second image data, common to the first position in the first image data, having the character string received by the receiving unit.

5. The image processing apparatus according to claim 1, further comprising:
a display control unit configured to display the input image data on a display unit,
wherein the display control unit displays in different display forms a character string, at a position common to the first image data and the second image data, which is determined by the determination unit, as matched data and a character string, at a position common to the first image data and the second image data, which is determined by the determination unit as non-matched data.

6. The image processing apparatus according to claim 3, further comprising:
a display control unit configured to display the input image data on a display unit,
wherein the display control unit displays in different display forms a character string, at a position common to the first image data and the second image data, which is determined by the determination unit as matched data and a character string, at a position common to the first image data and second image data, which is determined by the determination unit as non-matched data.

7. The image processing apparatus according to claim 5, wherein the display control unit displays in different display forms on the display unit a character string, at a position common to the first image data and the second image data, which is determined by the determination unit as matched data and a character string, at a position common to the first image data and second image data, which is determined by the determination unit as non-matched data out of character strings including a character larger than a predetermined size.

8. The image processing apparatus according to claim 6, wherein the display control unit displays in different display forms on the display unit a character string, at a position common to the first image data and the second image data, which is determined by the determination unit as matched data and a character string, at a position common to the first image data and second image data, which is determined by the determination unit as non-matched data, out of character strings including a character larger than a predetermined size.

9. The image processing apparatus according to claim 1, further comprising
a selection unit configured to select whether the first image data and the second image data are to be stored in one folder or in different folders,
wherein, in a case where storage in one folder is selected by the selection unit, the receiving unit is controlled to be able to receive only a character string matched at a position common to the first image data and the second image data, and
wherein, in a case where storage in different folders is selected by the selection unit, the receiving unit is controlled to be able to receive only a character string non-matched at a position common to the first image data and the second image data.

10. The image processing apparatus according to claim 3, further comprising
a selection unit configured to select whether the first image data and the second image data are to be stored as one file or as different files,
wherein, in a case where storage as one file is selected by the selection unit, the receiving unit is controlled to be able to receive only a character string matched at a position common to the first image data and the second image data, and
wherein, in a case where storage as different files is selected by the selection unit, the receiving unit is controlled to be able to receive only a character string non-matched at a position common to the first image data and the second image data.

11. The image processing apparatus according to claim 1, wherein, specified pages out of a document input by the input unit are the first image data and the second image data.

12. The image processing apparatus according to claim 3, wherein, specified pages out of a document input by the input unit are the first image data and the second image data.

13. An image processing method comprising:
inputting first image data and second image data, the first and second image data having a same layout;
extracting text data of character strings contained in the first image data and information about position of the character strings in the first image data, and extract text data of character strings contained in the second image data and information about position of the character strings in the second image data;
receiving, from a user, a specifying of one character string out of the character strings contained in the first image data;
determining whether a character string at a position, in the second image data having the same layout as the first image data, common to the first position in the first image data matches the one character string, the specification of which has been received from the user, using the text data and the information about the position of the text data extracted from the first image data and text data and information about the position of the text data extracted from the second image data; and
storing, in a case where it is determined that the character string at the position in the second image data, common to the first position in the first image data, matches the one character string, the first image data and the second image data in one folder of which a name includes the received character string and storing, in a case where it is determined that the character string at the position, in the second image data common to the first position in the first image data, does not match the one character string, the first image data and the second image data in different folders.

14. An image processing method comprising:

inputting first image data and second image data, the first image data and the second image data having a same layout;

extracting text data of character strings contained in the first image data and information about position of the character strings in the first image data, and extract text data of character strings contained in the second image data and information about position of the character strings in the second image data;

receiving, from a user, a specifying of one character string out of the character strings contained in the first image data;

determining whether a character string at a position, in the second image data having the same layout as the first image data, common to the first position in the first image data matches the one character string, the specification of which having been received from the user, using the text data and the information about the position of the text data extracted from the first image data and the text data and the information about the position of the text data extracted from the second image data; and storing, in a case where it is determined that the character string at the position in the second image data, common to the first position in the first image data, matches the one character string, the first image data and the second image data in one file of which a name includes the received character string and storing, in a case where it is determined that the character string at the position in the second image data, common to the first position in the first image data, does not match the one character string, the first image data and the second image data as different files.

15. A non-transitory computer readable storage medium storing instructions, which when executed by a computer, execute an image processing method, the method comprising inputting first image data and second image data, the first and second image data having a same layout;

extracting text data of character strings contained in the first image data and information about position of the character strings in the first image data, and extract text data of character strings contained in the second image data and information about position of the character strings in the second image data;

receiving, from a user, a specifying of one character string out of the character strings contained in the first image data;

determining whether a character string at a position, in the second image data having the same layout as the first image data, common to the first position in the first image data matches the one character string, the specification of which has been received from the user, using the text data and the information about the position of the text data extracted from the first image data and text data and information about the position of the text data extracted from the second image data; and storing, in a case where it is determined that the character string at the position in the second image data, common to the first position in the first image data, matches the one character string, the first image data and the second image data in one folder of which a name includes the received character string and storing, in a case where it is determined that the character string at the position, in the second image data common to the first position in the first image data, does not match the one character string, the first image data and the second image data in different folders.

16. A non-transitory computer readable storage medium storing instructions, which when executed by a computer, execute an image processing method, the method comprising inputting first image data and second image data, the first image data and the second image data having a same layout;

extracting text data of character strings contained in the first image data and information about position of the character strings in the first image data, and extract text data of character strings contained in the second image data and information about position of the character strings in the second image data;

receiving, from a user, a specifying of one character string out of the character strings contained in the first image data;

determining whether a character string at a position, in the second image data having the same layout as the first image data, common to the first position in the first image data matches the one character string, the specification of which having been received from the user, using the text data and the information about the position of the text data extracted from the first image data and the text data and the information about the position of the text data extracted from the second image data; and storing, in a case where it is determined that the character string at the position in the second image data, common to the first position in the first image data, matches the one character string, the first image data and the second image data in one file of which a name includes the received character string and storing, in a case where it is determined that the character string at the position in the second image data, common to the first position in the first image data, does not match the one character string, the first image data and the second image data as different files.

* * * * *